(No Model.)

J. FUNK.
HAY RAKE AND LOADER.

No. 330,311. Patented Nov. 10, 1885.

Witnesses:
M. F. Anderson,
Orla C. Moore.

Inventor: John Funk,
By Thomas G. Orwig, Att'y.

UNITED STATES PATENT OFFICE.

JOHN FUNK, OF MENLO, IOWA.

HAY RAKE AND LOADER.

SPECIFICATION forming part of Letters Patent No. 330,311, dated November 10, 1885.

Application filed May 26, 1884. Serial No. 132,857. (No model.)

*To all whom it may concern:*

Be it known that I, JOHN FUNK, a citizen of the United States of America, and a resident of Menlo, in the county of Guthrie and State of Iowa, have invented a Hay Rake and Loader, of which the following is a specification.

My object is to save time and labor in gathering hay in a field and loading it upon a wagon to be conveyed out of the field; and my invention consists in the construction and combination of a carriage, a rake, a revolving fork, a fender to restrict the elevation of the hay relative to the rotating fork, three endless belts or carriers, and operating mechanism, as hereinafter fully set forth, in such a manner that the complete machine can be readily attached to the rear end of a wagon and automatically operated as the wagon is advanced in a hay field to gather hay from the ground and carry it up to the top of the wagon.

Heretofore rakes, rotating forks, and endless carriers have been combined in hay rakes and loaders; but my manner of combining a rake, a rotating fork, a rake-fender, and three distinct carriers to accomplish the results contemplated is novel and greatly advantageous.

Figure 1:
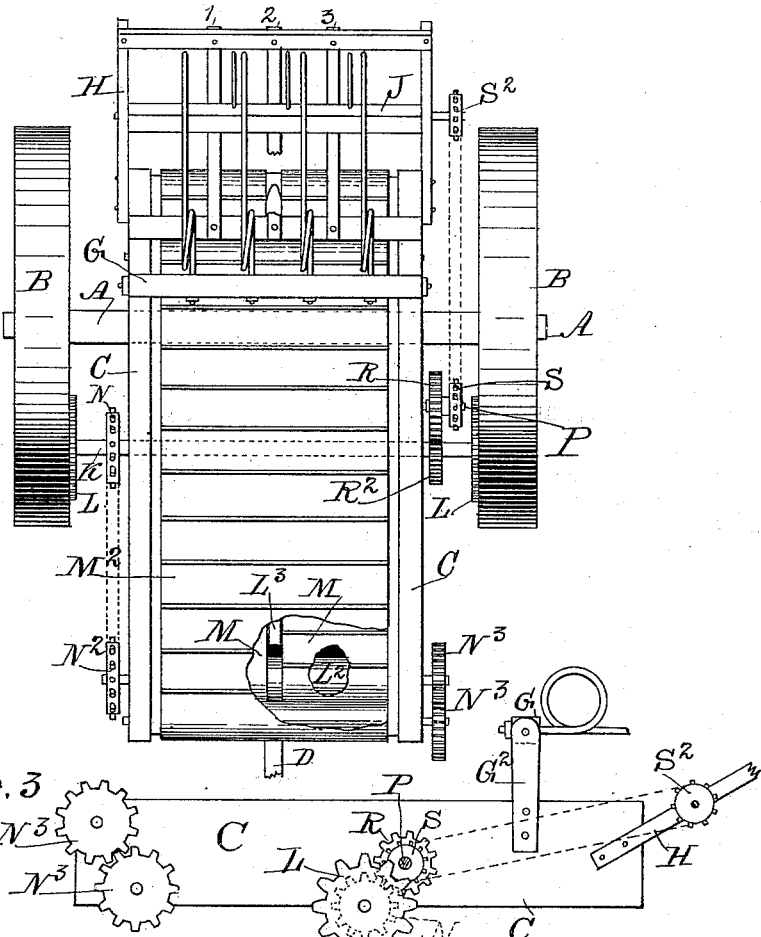
Figure 3:
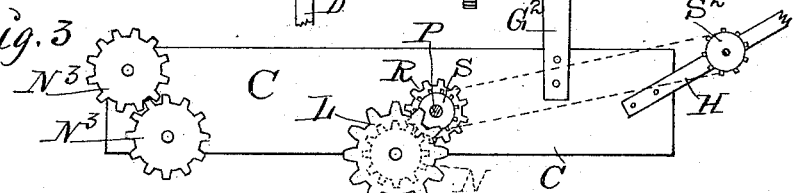
Figure 2:
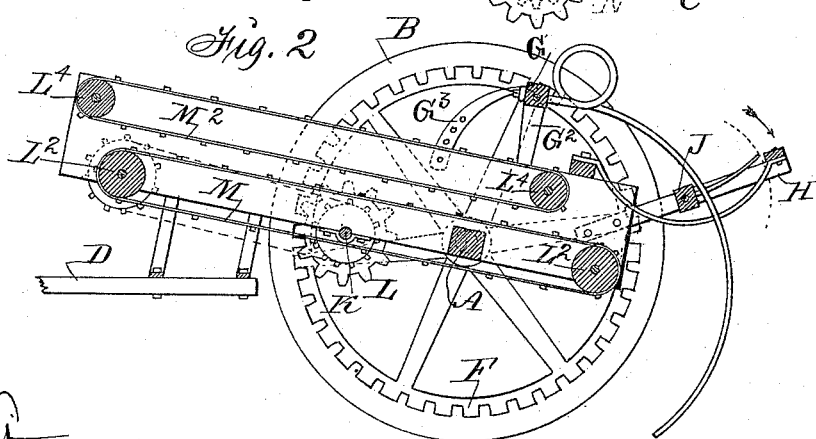

Figure 1 of the accompanying drawings is a top view, and Fig. 2 a longitudinal vertical section, of my machine. Fig. 3 is a side view of the gearing that operates the endless carriers and the rotating fork. Jointly considered, these figures clearly illustrate the construction and operation of my complete invention.

A represents the carriage-axle.

B B are traction-wheels upon the ends of the axle.

C C are the side pieces of an oblong frame and elevator fixed to the axle A.

D represents a pole fixed to the under side and front portion of the frame in such a manner that it can be readily attached to the rear end of a wagon by means of a hook or in any suitable way to detachably connect the complete machine with a wagon.

F F are internal gear-wheels formed on or fixed to the traction-wheels B.

G is the head of a rake, pivoted to bearings $G^2$, that are fixed to the rear portion of the sides C of the frame to project upward. A series of spring-teeth are fixed to the rake-head in a common way in such a manner that their free ends will project rearward and to the ground. $G^3$ represents a rod fixed to the rake-head, to be adjustably connected with the side C for the purpose of elevating and retaining the rake-teeth inoperative whenever desired.

H represents a frame fixed to the rear ends of the side pieces, C, to project upward and rearward to support a series of bars or fenders, 1 2 3, that are bowed downward between the rake-teeth.

J is a rotating fork that has its bearings formed in or attached to the side pieces of the frame H.

K is a shaft that revolves in bearings attached to the sides C of the elevator-frame.

L are gear-wheels fixed to the ends of the shaft K to engage the internal gear-wheels, F.

$L^2$ are rollers in the opposite ends and under side of the elevator-frame.

$L^3$ is a bar fixed to the axle A and a cross-piece at the front end of the elevator-frame. An endless carrier, M, is placed upon the rollers $L^2$ on each side of the bar $L^3$.

$L^4$ are rollers in a plane above the rollers $L^2$, and an endless carrier, $M^2$, is placed upon them in such a manner that hay can be advanced from the rake to the wagon between the carriers M and $M^2$.

N is a chain-wheel fixed to the shaft K. $N^2$ is a chain-wheel fixed to the axle of the roller $L^2$ at the front end of the elevator. A chain placed upon the wheels N and $N^2$ transmits power and motion from the shaft K to the roller $L^2$ to operate the parallel endless carriers M.

$N^3$ are gear-wheels fixed to the axles of the rollers $L^2$ and $L^4$ in such a manner that power and motion will be thereby transmitted from the roller $L^2$ to the roller $L^4$ as required to operate the endless carrier $M^2$.

P represents a stud bearing projecting horizontally from the side of the elevator-frame, to which it is fixed by means of a T-end, or in any suitable way.

R is a gear-wheel placed loosely upon the stud P to engage a corresponding wheel, $R^2$, fixed to the shaft K.

S is a chain-wheel formed on or fixed to the gear-wheel R.

$S^2$ is a chain-wheel fixed to the end of the axle of the rotating fork J. By placing a chain upon the wheels S and S² motion transmitted from the wheel R² to the wheel R will be imparted thereby to the chain-wheel S, and from thence transmitted to the wheel S² as required to rotate the fork J in concert with the movements of the endless carriers M and M² for the purpose of pushing the hay from the rake-teeth toward the carriers M and M², to be advanced between those carriers to the wagon. The carriers will mutually aid each other in elevating the hay, and at the same time pack it to a certain degree and protect it from the wind, as required, to prevent it from dropping and scattering after it has been raked together and elevated.

From the description of the construction and function of each element and sub-combination, the unitary action of all the parts and the practical operation of my complete machine are obvious.

I claim as my invention—

1. A carriage having internal spur-gears, F, on its wheels, an elevator-frame having a shaft, K, carrying gear-wheels L, the rollers L² and L⁴, the endless carriers M and M², and the chain-wheels N and N², arranged and combined, substantially as shown and described, to operate in the manner set forth, for the purposes stated.

2. The combination of the stud-bearing P, the wheel R, and chain-wheel S, the shaft K, having a fixed wheel, R², and the rotating fork J, having a chain-wheel, S², on its end, substantially as shown and described, to operate in the manner set forth, for the purposes specified.

3. The improved hay rake and loader composed of the carriage A B B, the elevator-frame C, C, D, and L, the three endless carriers M M M², the rake G, the frame H, having a series of fenders, 1 2 3, the rotating fork J, the internal gear-wheels, F, the shaft K, carrying wheels L, the chain-wheels N and N², the gear-wheels N³, and the fork-operating mechanism P, R, R², S, and S², substantially as shown and described.

JOHN FUNK.

Witnesses:
J. M. DUNN,
THOS. M. CLARY.